US 011322025B2

United States Patent
Zhang et al.

(10) Patent No.: US 11,322,025 B2
(45) Date of Patent: May 3, 2022

(54) METHOD AND SYSTEM FOR VALIDATING EXISTENCE OF ROADWORK

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

(*) Notice: Subject to any disclaimer, the term of this patent is extended or adjusted under 35 U.S.C. 154(b) by 548 days.

(21) Appl. No.: 16/218,037

(22) Filed: Dec. 12, 2018

(65) Prior Publication Data
US 2020/0193823 A1    Jun. 18, 2020

(51) Int. Cl.
*G08G 1/0967* (2006.01)
*G01C 21/36* (2006.01)
*G06K 9/00* (2022.01)
*G08G 1/0962* (2006.01)

(52) U.S. Cl.
CPC ...... *G08G 1/096791* (2013.01); *G01C 21/3602* (2013.01); *G06K 9/00798* (2013.01); *G08G 1/09623* (2013.01)

(58) Field of Classification Search
CPC ......... G08G 1/096791; G08G 1/09623; G08G 1/0129; G08G 1/0141; G08G 1/0112; G01C 21/3602; G01C 21/3819; G06K 9/00798; G06K 9/6288
USPC ........................... 701/23, 414, 422, 423, 450
See application file for complete search history.

(56) References Cited

U.S. PATENT DOCUMENTS

| | | |
|---|---|---|
| 9,141,107 B2 * | 9/2015 | Ferguson ............ G06K 9/00818 |
| 9,221,461 B2 | 12/2015 | Ferguson et al. |
| 9,365,213 B2 | 6/2016 | Stenneth et al. |
| 9,513,632 B1 | 12/2016 | Gordon et al. |
| 9,989,963 B2 | 6/2018 | Perkins et al. |
| 2018/0315305 A1 * | 11/2018 | Thelen ................. G08G 1/0141 |
| 2018/0365507 A1 * | 12/2018 | Hackeloeer .......... G08G 1/0145 |
| 2019/0362159 A1 * | 11/2019 | Cooley ................... H04L 67/18 |
| 2020/0042807 A1 * | 2/2020 | Schutzmeier ......... G08G 1/0141 |

FOREIGN PATENT DOCUMENTS

| | | |
|---|---|---|
| EP | 2583263 B1 | 3/2014 |
| WO | WO-2018210468 A1 * | 11/2018 ......... G06K 9/00818 |

OTHER PUBLICATIONS

Kunz et al., "Automated Detection of Construction Sites on Motorways", Jun. 2017, 8 pages.

(Continued)

*Primary Examiner* — Nadeem Odeh
(74) *Attorney, Agent, or Firm* — Ditthavong, Steiner & Mlotkowski

(57) ABSTRACT

A computer-implemented method for validating the existence of roadwork is provided. The method comprises, for example, retrieving information for at least one segment of a road captured by a plurality of vehicles. The information comprises at least two of lane marking data, speed funnel presence data, and traffic behavior change data. The method also comprises generating a confidence score based on analysis of the retrieved information. The method further comprises validating the existence of the roadwork on the at least one segment of the road based on the generated confidence score.

18 Claims, 10 Drawing Sheets

(56) References Cited

OTHER PUBLICATIONS

Lauffenburger et al., "Navigation and Speed Signs Recognition Fusion for Enhanced Vehicle Location", Proceedings of the 17th World Congress the International Federation of Automatic Control Seoul, Korea, Jul. 6-11, 2008, published Jan. 2008, pp. 2069-2074.

* cited by examiner

METHOD AND SYSTEM FOR VALIDATING EXISTENCE OF ROADWORK

TECHNOLOGICAL FIELD

The present disclosure generally relates to identification of roadwork zones in a geographical region, and more particularly relates to integrating sensor signals for roadwork zone identification.

BACKGROUND

Providing environmental awareness for vehicle safety, particularly in autonomous driving, has been a primary concern for automobile manufacturers and related service providers. An autonomous vehicle should be able to identify its environment and take into account a variety of factors and make appropriate decisions. For example, knowing whether the road on which the vehicle is travelling is undergoing construction or any other kind of roadwork in advance may help make decisions. However, current autonomous or driver-assist vehicle systems may be unable to adequately identify or respond to construction zones on roadways.

BRIEF SUMMARY

Therefore, there is a need to provide a more reliable technique for validating existence of roadwork on a road.

According to one embodiment, a computer-implemented method for validating the existence of roadwork is provided. The method comprises retrieving information for at least one segment of a road captured by a plurality of vehicles. The information comprises at least two of lane marking data, speed funnel presence data, and traffic behavior change data. The method also comprises generating a confidence score based on analysis of the retrieved information. The method further comprises validating the existence of the roadwork on the at least one segment of the road, based on the generated confidence score.

According to another embodiment, a system for validating the existence of roadwork is provided. The system comprises at least one memory configured to store computer program code instructions, and at least one processor configured to execute the computer program code instructions to retrieve information for at least one segment of a road captured by a plurality of vehicles. The information comprises at least two of lane marking data, speed funnel presence data, and traffic behavior change data. The system is also caused to generate a confidence score based on analysis of the retrieved information. The system is further caused to validate the existence of the roadwork on the at least one segment of the road, based on the generated confidence score.

According to yet another embodiment, a non-transitory computer-readable storage medium for validating the existence of roadwork is provided, carrying one or more sequences of one or more instructions which, when executed by one or more processors, cause an apparatus to perform: retrieving information for at least one segment of a road captured by a plurality of vehicles, wherein the information comprises at least two of lane marking data, speed funnel presence data, and traffic behavior change data; generating a confidence score based on analysis of the retrieved information; and validating the existence of the roadwork on the at least one segment of the road, based on the generated confidence score.

According to one or more embodiments, a first portion of the at least one segment of the road is determined based on the lane marking data, a second portion of the at least one segment of the road is determined based on the speed funnel presence data, and a third portion of the at least one segment of the road is determined based on the traffic behavior change data. Also, weights are assigned to each of the first portion, the second portion and the third portion, wherein a sum of the weights of the first portion, the second portion and the third portion is equal to 1. Further, one or more sections of the at least one segment of the road are determined, wherein each of the one or more sections overlaps at least one of the first portion, the second portion and the third portion; and confidence score for each of the one or more sections is calculated based on the weights assigned to the corresponding overlapped first portion, the second portion and the third portion. The confidence score of each of the one or more sections is calculated as sum of the weights of the corresponding overlapped first portion, the second portion and the third portion. The confidence score of each of the one or more sections varies between 0 and 1.

According to one or more embodiments, an autonomous driving mode of a vehicle travelling on one of the one or more sections of the at least one segment of the road is regulated based on the corresponding confidence score for the section. The autonomous driving mode of the vehicle is deactivated if the confidence score for the section ahead is between a cut-off threshold and 1. A notification is sent to a human operator of the vehicle warning about roadwork if the confidence score for the section ahead is greater than 0 and less than a cut-off threshold.

According to one or more embodiments, a first portion of the at least one segment of the road undergoing roadwork is determined based on the presence of the lane marking thereon, a second portion of the at least one segment of the road undergoing roadwork is determined based on the presence of the speed funnel thereon, and a third portion of the at least one segment of the road undergoing roadwork is determined based on the determined change in traffic behavior thereon. A combined range of the first portion, the second portion and the third portion is calculated to determine an extensive section of the at least one segment of the road undergoing roadwork. An autonomous driving mode of a vehicle travelling on the extensive section of the at least one segment of the road is deactivated.

According to one or more embodiments, presence of the lane marking is detected, using an imaging device, by discerning a typical bright color of the lane marking from a background of the road ahead thereof. Further, presence of the speed funnel is detected, using an imaging device, by discerning shape of the speed funnel from a background of the road ahead thereof. Further, the change in traffic behavior is determined by analyzing change in one or more of nominal speed and traffic direction of other vehicles travelling ahead on the road. Alternatively, or additionally, the change in traffic behavior is determined by monitoring one or more of vehicle-to-infrastructure communication, vehicle-to-vehicle communication and traffic report broadcast.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, system, and computer program for validation of roadwork on a road are disclosed herein. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
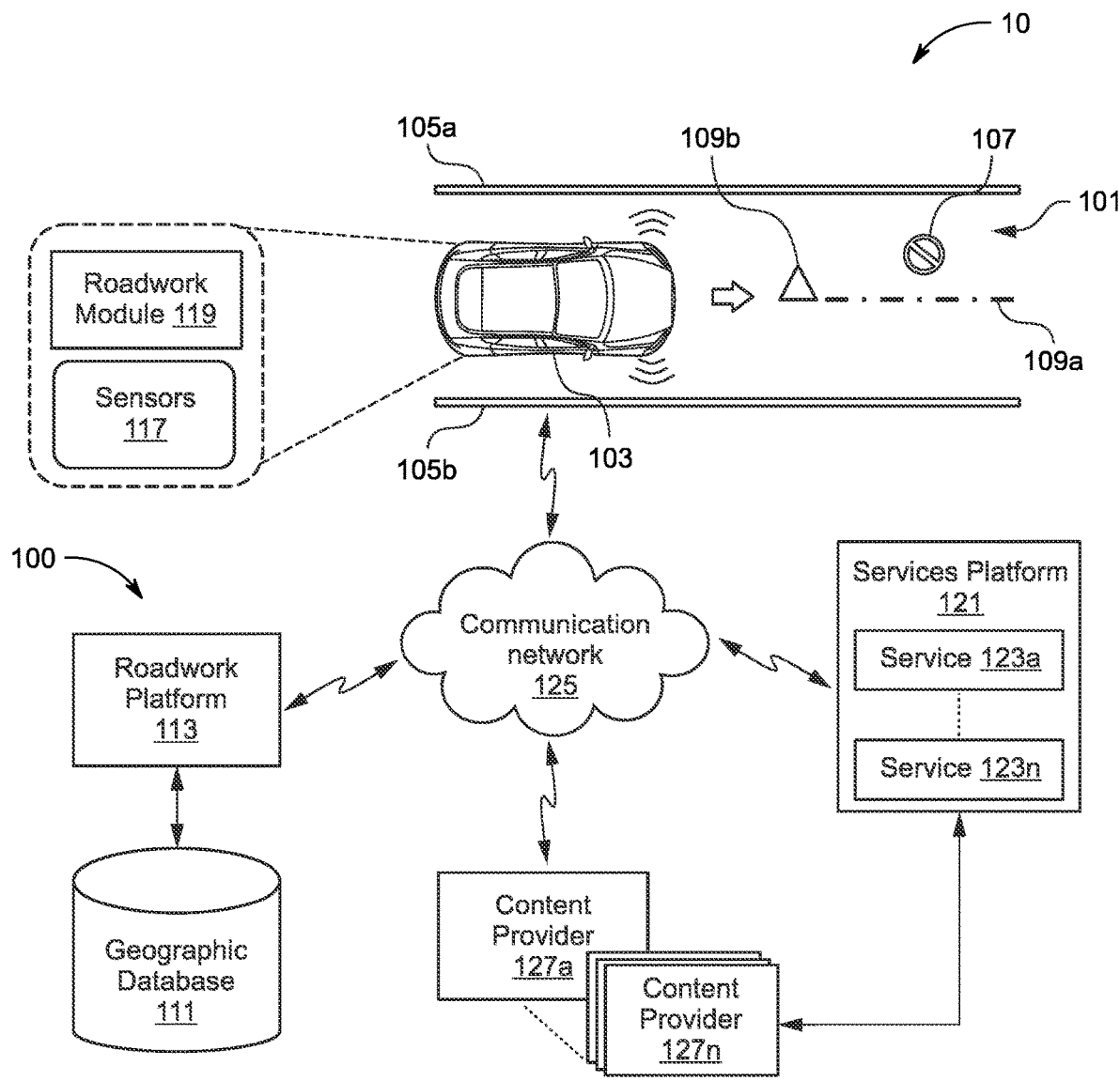
FIG. 1 is a depiction of a navigation system in which a system capable of validating the existence of roadwork is being implemented, according to one embodiment.

FIG. 1 is a diagram of a navigation scenario 10 in which a system 100 is implemented for validating the existence of roadwork on a road, according to one embodiment. The system 100 may be embodied as a cloud-based service that is remotely located with respect to vehicles travelling on the road 101. Having knowledge of whether the road ahead is undergoing roadwork can provide important situational awareness and improved safety to vehicles, particularly autonomous vehicles that operate with reduced or no human driver input. In other words, an understanding of whether there is roadwork ahead on a segment of the road on which the vehicle is travelling is crucial for an autonomous vehicle to safely plan a route. For example, in the navigation scenario 10 as shown in FIG. 1, the system 100 may be implemented for validating the existence of roadwork on a road 101 which may support traffic with a vehicle 103 traveling thereon. In this example, the road 101 may extend between a first physical divider 105a and a second physical divider 105b.

As illustrated in FIG. 1, the road 101 is shown undergoing roadwork (as represented by numeral 107) on at least one segment thereof. Herein, the roadwork is defined as any temporary intervention that reduces capacity from the road network. Roadworks can be a major source of disruption when there is insufficient practical reserve capacity in the road network. Due to the varying nature of roadworks, there are no explicit instructions on the configuration and coordination of roadworks. The Department for Transport (2008)

has produced signal timing guidelines for contractors to assist with programming temporary traffic signals.

When there is a roadwork, traffic management such as temporary traffic signals or width restrictions may be introduced. In general, when a vehicle encounters roadwork, the vehicle may have to change its speed and/or direction. Herein, the roadwork may be defined as any obstacle, object or event, on the road which causes a vehicle to change its speed and/or direction. The roadwork may be classified as per US Department of Transportation which defines that the work zone (roadwork) extends from the first warning sign or flashing lights on a vehicle to the "End of Road Work" sign or the last traffic control device. The roadwork may be any type of construction or repair work, and may comprise one or more of road repair work, road expansion work, road construction work and road pavement work.

Traditionally, vehicles travelling on a road are warned about roadwork ahead on the road 101 using one or more of lane marking (as represented by numeral 109a in FIG. 1) and one or more traffic signs (as represented by numeral 109b in FIG. 1). The lane marking 109a notates a change in the traffic flow due to a roadwork on the road, and the speed funnel 109b is a formal notice to the vehicles to decelerate ahead due to a roadwork on the road. The lane marking 109a is typically a bright colored tape, such as, yellow lane marking, which may be extending along length of the segment of the road 101 undergoing roadwork. Herein, the traffic signs 109b notates a gradual change in traffic speed (referred to herein as "speed funnel," and hereinafter interchangeably used with the term "traffic sign"). The speed funnel 109b, may refer to a group of two or more speed limit signs indicating a change in sign values of speed limit signs from one end of the speed funnel to the other. A speed funnel may be used as an indication for a roadwork zone, an upcoming tunnel on a pathway, or a transition from a highway to a ramp. Conventionally, the speed funnel 109b is found well ahead of the roadwork, generally even before where the lane marking 109a starts extending. It may be appreciated that other kinds of warning signs may additionally be used to indicate the roadwork including, but not limited to, caution sign, road barriers, construction site delineator posts, guardrails, guide walls, etc. without any limitations.

Figure 2:
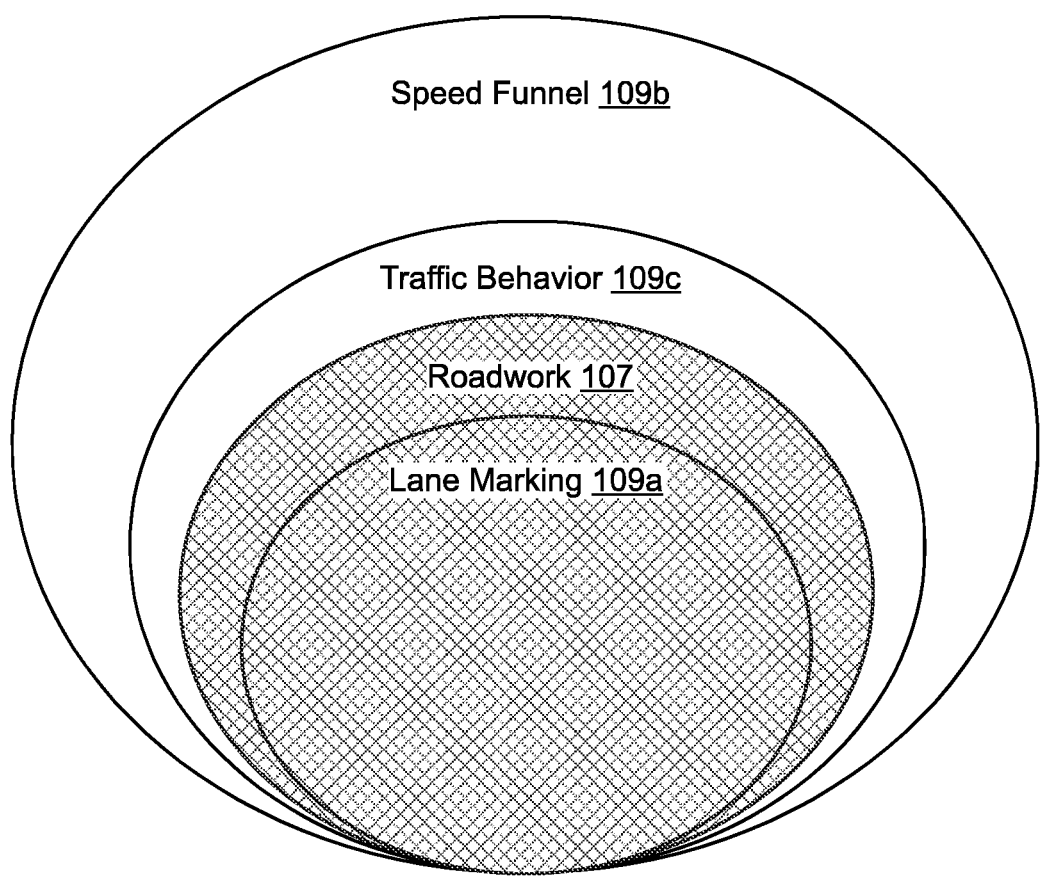
FIG. 2 is a diagram illustrating example parameters for use in validating the existence of roadwork, according to one embodiment.

Furthermore, in the present embodiments, traffic behavior (represented by numeral 109c in FIG. 2) is used as an indication for the roadwork. As discussed later, the system 100 may, generally, estimate nominal speeds and flow of traffic of other vehicles travelling on the road 101. In some examples, again discussed later, the system 100 may specifically determine a change in nominal speed and flow of traffic of other vehicles, for example based on the traffic information, and compare the change in behavior of other vehicles to a predetermined or typical pattern of traffic changes associated with approaching a given segment of the road undergoing roadwork, such as construction zone. Some other techniques for determining change in traffic behavior may also be employed, as also discussed later in the description.

Generally, a roadwork should have a speed funnel but presence of the speed funnel does not necessarily indicate or validate, in itself, existence of a roadwork. For example, a speed funnel 109b may also indicate lane merger. On the other hand, a roadwork may not necessarily have lane marking but presence of the lane marking should generally indicate or validate, in itself, existence of a roadwork. Furthermore, a roadwork should have a traffic speed reduction but the traffic speed reduction in itself does not necessarily indicate or validate, in itself, existence of a roadwork. These conditional parameters have been represented in the illustration of FIG. 2. As may be seen, the roadwork 107 is represented by a shaded circle; the lane marking 109a is a subset of the roadwork 107 representing that presence of the lane marking should generally indicate the roadwork 107, and so forth.

The system 100 of the present disclosure (as illustrated in FIG. 1) validates the existence of roadwork on a segment of road using computational techniques to process vehicular sensor data and/or map data. The system 100 may, but not necessarily, use machine learning models (e.g., a supervised learning algorithm implementing Random Forest, Decision Tree, Neural Net, or equivalent techniques) to achieve the purpose. In one embodiment, the system 100 includes a roadwork platform 113 to predict the roadwork 107 on a road segment of interest in the road 101 based on map data associated with the segment of interest, vehicular sensor data collected from vehicles (e.g., the vehicle 103 equipped with an array of sensors 117), or a combination thereof. In one embodiment, at least one vehicle (e.g., vehicle 103) may be associated with a roadwork module 119 working in cooperation with the sensors 117 to extract vehicular sensor data. The roadwork module 119 may be part of the system 100 and be configured to perform one or more functions associated with detection of the roadwork 107 alone or in combination with the roadwork platform 113. In some examples, the roadwork platform 113 and the roadwork module 119 may be integrated into one module without any limitations. In one or more embodiments, the components and processes of the system 100 of the present disclosure can also be implemented in a stand-alone apparatus (similar to the system 100) without any limitations.

Figure 6:
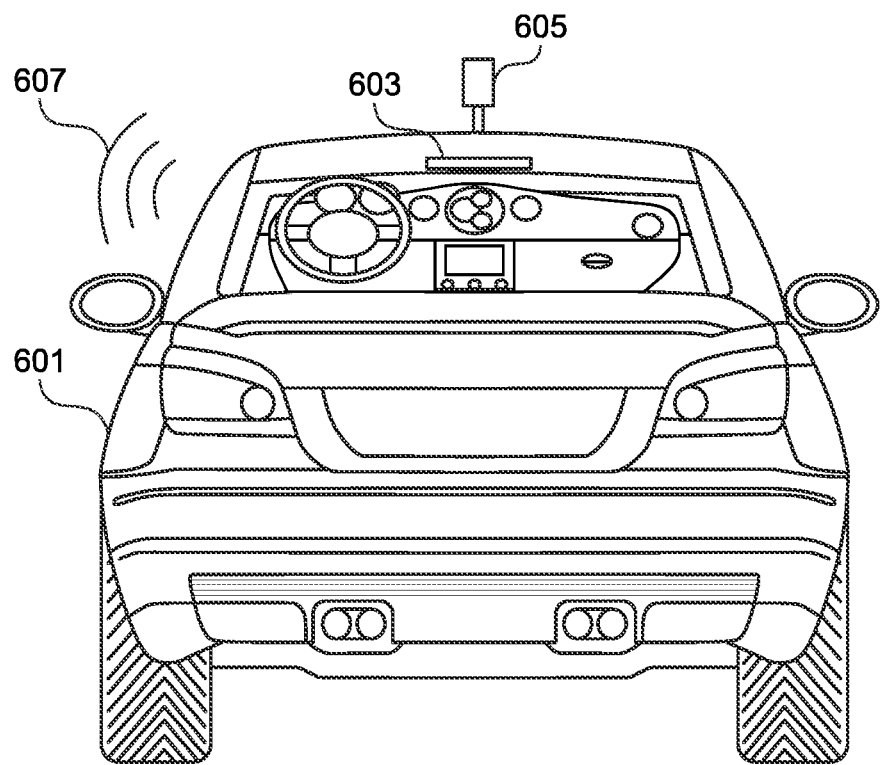
FIG. 6 is a diagram illustrating an example of a vehicle equipped with sensors to support validation of the existence of roadwork, according to one embodiment.

In particular, the system 100 may utilize vehicular sensor data collected from vehicles (e.g., the vehicle 103 equipped with the array of sensors 117) for generating lane marking data (based on the detected presence of the lane marking 109a) and speed funnel presence data (based on the detected presence of the speed funnel 109b). In some example embodiments, the vehicles may capture road sign observations and may transmit the road sign observations to an OEM cloud and the system 100 may retrieve the road sign observations from the OEM cloud. In some example embodiments, the road sign observations may be directly retrieved by the system 100 from the vehicles in a dynamic manner. Still in some example embodiments, the vehicles may perform detection of one or more speed funnels from the road sign observations and may report the data pertaining to the detected one or more speed funnels to the system 100. In one or more embodiments, the sensors 117 may include an imaging device (such as, imaging device 603 and/or 605 as shown in FIG. 6). The imaging device may be installed on the vehicle 103 in a manner to gather images of the road 101. The imaging device, or the roadwork module 119 associated therewith, can be configured to detect presence of the lane marking 109a by discerning a typical bright color of the lane marking (such as, yellow color) from a background of the road (which is generally grey color) ahead thereof. Further, the imaging device may be configured to capture one or more images of the traffic signs 109b, and the captured images data may be analyzed to recognize speed values associated with the traffic signs 109b which, in turn, may be utilized to estimate the speed funnel associated with the road.

In some embodiments, the system 100 may utilize vehicular sensor data collected from vehicles (e.g., the vehicle 103 equipped with the array of sensors 117) for generating traffic behavior change data (based on the determined change in traffic behavior 109c). In particular, the system 100 determines the change in traffic behavior by analyzing change in one or more of nominal speed and traffic direction of other vehicles travelling ahead on the road 101. In one or more examples, the system 100 may utilize the images taken by the imaging device itself to analyze change in the nominal speed and the traffic direction of other vehicles travelling ahead on the road 101. Such analysis may be implemented by, for example, the imaging device itself, or the roadwork module 119 associated therewith, and may employ image processing and machine learning techniques which are generally known in the art. In other embodiments, the system 100 may determine the change in traffic behavior on the road 101 based on received information. In particular, the sensors 117 may include a communication device (such as, communication device 607 as shown in FIG. 6) which may be utilized to implement one or more of vehicle-to-infrastructure communication, vehicle-to-vehicle communication and traffic report broadcast to receive information related to the traffic behavior. The system 100 may determine the change in traffic behavior on any of the segment of the road 101 by monitoring and processing the said vehicle-to-infrastructure communication, vehicle-to-vehicle communication and traffic report broadcast corresponding to that segment of the road 101, as may be contemplated by a person skilled in the art. In some example embodiments, individual vehicles may report their average speeds computed for a predetermined period of time to the system 100 periodically. The roadwork platform 113 may thus determine the change in traffic behavior based on the reported average speeds. Any suitable technique may be utilized for the aforesaid objective.

Figure 3:
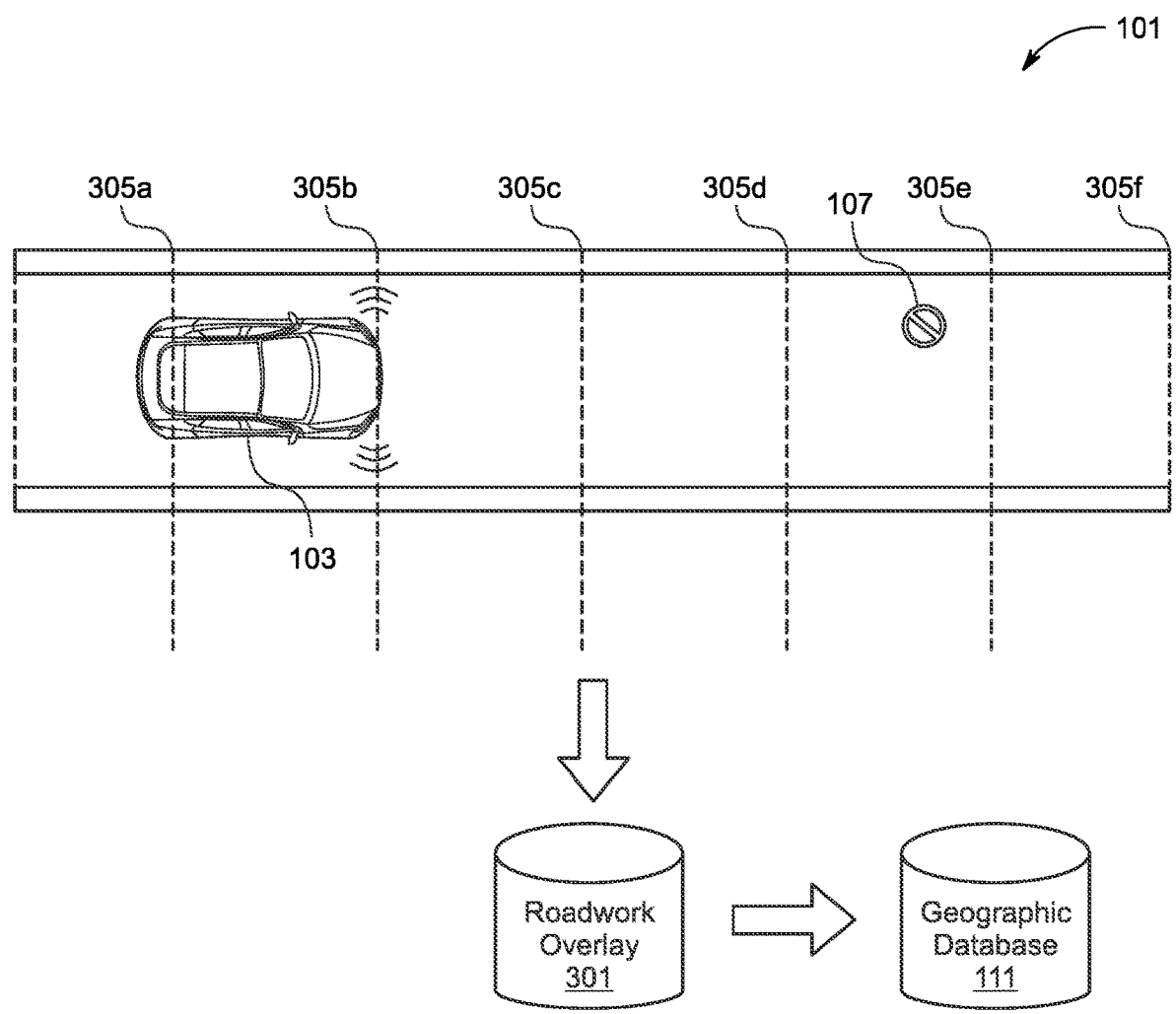
FIG. 3 is a diagram illustrating a process for creating a roadwork overlay for segments of a road, according to one embodiment.

In some embodiments, the roadwork platform 113 segments the road 101 represented in a map database (e.g., a geographic database 111, as also illustrated in FIG. 1) into segments of a predetermined length. The roadwork platform 113 may make roadwork predictions for each segment of the road. FIG. 3 is a diagram illustrating an example process for creating a roadwork overlay 301 for segments of the road 101, according to one embodiment. In one embodiment, the roadwork overlay 301 is a data structure that can be associated with the geographic database 111. The roadwork overlay 301 stores, for instance, parametric representations of predicted roadwork 107 and/or other related attributes in association with corresponding segments of the road 101. As shown, the roadwork platform 113 segments the road 101 into segments 305a-305f (also collectively referred to as segments 305). The roadwork platform 113 may then collect map data and vehicular sensor data from vehicles (e.g., the vehicle 103) as the vehicles traverse each segment 305a-305f of the road 101.

Figure 4:
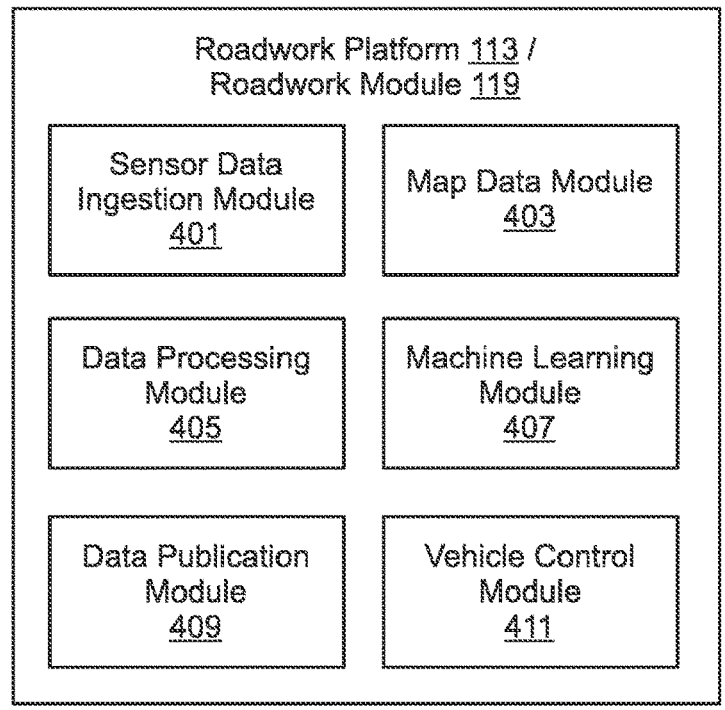
FIG. 4 is a diagram of the components of a roadwork platform, according to one embodiment.

FIG. 4 is a diagram of the components of the roadwork platform 113 and/or the roadwork module 119, according to one embodiment. By way of example, the roadwork platform 113 and/or the roadwork module 119 includes one or more components for the validation of roadwork on a road, according to the various embodiments described herein. It is contemplated that the functions of these components may be combined or performed by other components of equivalent functionality. In this embodiment, the roadwork platform 113 include a sensor data ingestion module 401, a map data module 403, a data processing module 405, a machine learning module 407, a data publication module 409, and a vehicle control module 411. The above presented modules and components of the roadwork platform 113 may be implemented in hardware, firmware, software, or a combination thereof. Though depicted as separate entities in FIG. 1, it is contemplated that the roadwork platform 113 may be implemented as a module of any of the components of the system 100; e.g., a component of the vehicle 103, services platform 121, services 123a-123n (also collectively referred to as services 123), etc. In another embodiment, one or more of the modules 401-411 may be implemented as a cloud based service, local service, native application, or a combination thereof. The functions of the roadwork platform 113, roadwork module 119, and modules 401-411 are discussed with respect to FIGS. 5-9 below.

Figure 5:
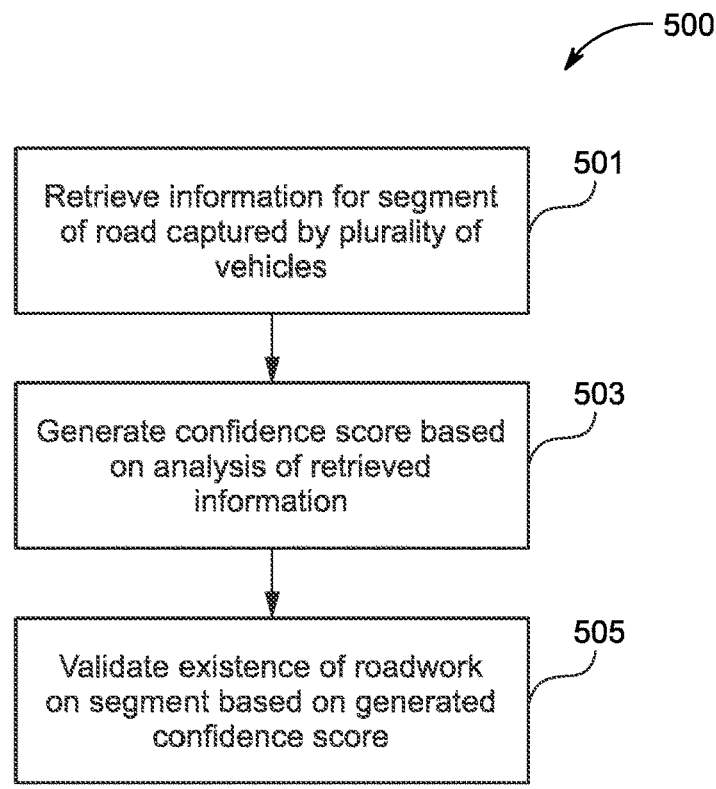
FIG. 5 is a flowchart of a method for validating the existence of roadwork, according to one embodiment.
Figure 12:
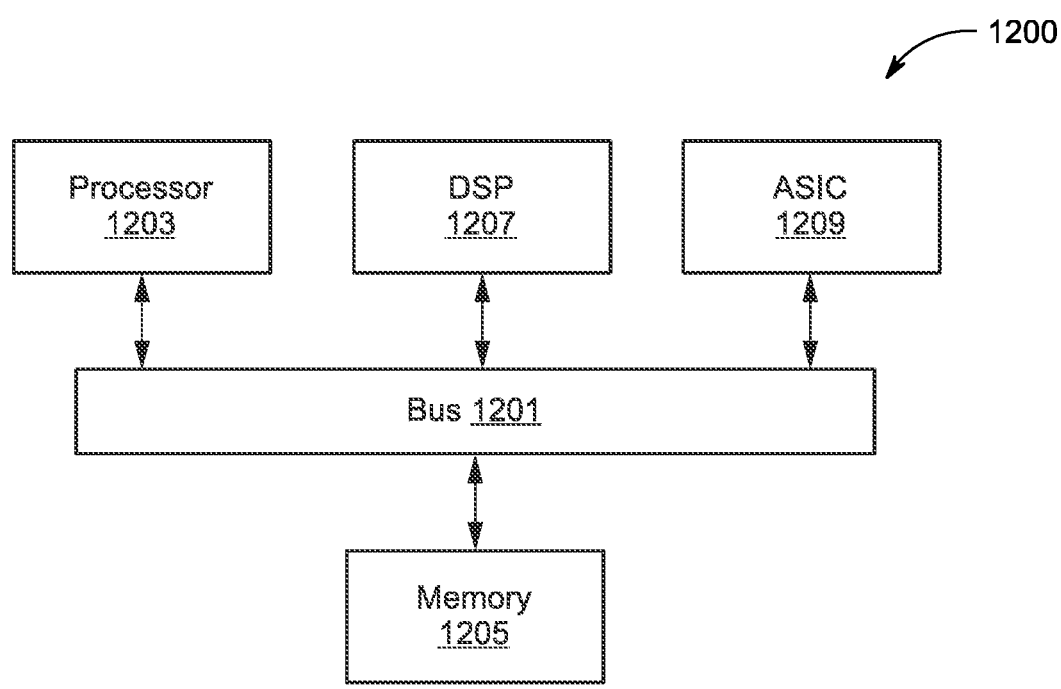
FIG. 12 is a diagram of a chip set that can be used to implement an embodiment.

FIG. 5 is a flowchart of a method 500 for validating the existence of roadwork on a road, according to one embodiment. In various embodiments, the roadwork platform 113, roadwork module 119, and/or any of the modules 401-411 may perform one or more portions of the method 500 and may be implemented in, for instance, a chip set including a processor and a memory as shown in FIG. 12. As such, roadwork platform 113, roadwork module 119, and/or any of the modules 401-411 can provide means for accomplishing various parts of the method 500, as well as means for accomplishing embodiments of other processes described herein in conjunction with other components of the system 100. Although the method 500 is illustrated and described as a sequence of steps, its contemplated that various embodiments of the method 500 may be performed in any order or a combination and need not include all of the illustrated steps. The method 500, for instance, describes the process for using lane marking data, speed funnel presence data, and traffic behavior change data to for validating the existence of roadwork for a given road segment.

In step 501, the method 500 includes retrieving information for at least one segment of a road captured by a plurality of vehicles. In particular, the information comprises at least one of lane marking data, speed funnel presence data, and traffic behavior change data. The retrieved information may help to estimate a possibility of the roadwork for at least one segment of the road 101. Herein, the roadwork platform 113 can use a map database (e.g., the geographic database 111) for defining segments on the road 101, as discussed above. Further, the roadwork platform 113 may make roadwork predictions for each segment of the road based on the previously available data or the like. In one example, the sensor data ingestion module 401 can be used to retrieve vehicular sensor data, and the map data module 403 can be used to retrieve map data for given segment of a road.

FIG. 6 is a diagram illustrating an example of a vehicle 601 equipped with sensors 117 to capture at least one of lane marking data, speed funnel presence data, and traffic behavior change data. As shown, a vehicle 601 may be equipped with an imaging device, such as, one or more of a camera sensor 603, a LiDAR sensor 605 (and/or RADAR sensor 605), a position sensor, a motion sensor and the like. Each of these sensors 603 and 605 are capable of sensing the presence of a lane marking and a speed funnel individually. Further, the sensors 117 may include a communication device 607 to retrieve sensor data directly from other vehicles or traffic infrastructure with connected communications capabilities (e.g., cellular or other wireless communications equipped vehicles) or from an Original Equipment Manufacturer (OEM) provider (e.g., automobile manufacturer) operating an OEM platform (e.g., a services platform 123) that collects sensor data from vehicles manufactured by or otherwise associated with the OEM. The retrieval of the sensor data and/or the map data can occur in real-time or near real-time, continuously, periodically, according to a schedule, on demand, etc.

In some examples, the sensor data ingestion module 401, for instance, can fuse data from these multiple different sensors 603-607 to increase consistency of detection of the lane marking and the speed funnel. In some embodiments, the sensor data ingestion module 401 can also pre-process the collected raw sensor data to provide the vehicular sensor data for training of the machine learning model for better prediction of the roadwork thereby. In one embodiment, the vehicular sensor data is retrieved from a plurality of in-vehicle sensors installed in multiple vehicles traveling the road. The sensor data ingestion module 401 can use such sensor data from multiple vehicles traveling on the same road segment to determine additional attributes or features for lane marking data, speed funnel presence data, and traffic behavior change data.

In an embodiment where the map data is used alone or in combination with the sensor data, the map data module 403 can retrieve requested map data for a road segment of interest by performing a location-based query of the geographic database 111 or equivalent. By way of example, the map data can include any attribute of the road segment or corresponding map location stored in the geographic database 111. The retrieved map data can include, but is not limited to, a functional class, a speed limit, a presence of a road sign (e.g., school zone sign), a bi-directionality of the road, a number of lanes, a speed category, a distance to a nearby point of interest, or a combination thereof. The map data can also include the presence of non-vehicular travel lanes on the road segment (e.g., sidewalks, bicycle paths, etc.).

In one embodiment, the sensor data can be provided as location trace data in which each sensor data sampling point is associated with location coordinates of the collection vehicle. The location coordinates can be determined from location sensors (e.g., GPS/satellite-based location sensors or equivalent) and recorded with the sensor data. In this case, the sensor data ingestion module 401 can perform a map matching (e.g., using any map matching technique known in the art) of the location data of each sensor data sampling point to identify which road segment the sensor data sampling point belongs. In other words, each location trace is associated with segments of map road links and transformed into sensor data observations for a particular segment of the road link. For example, the data ingestion module 401 can use a path-based map matching algorithm by calculating the collection vehicle's direction of travel from the time stamp and GPS points present in the retrieved sensor data.

Figure 7A:
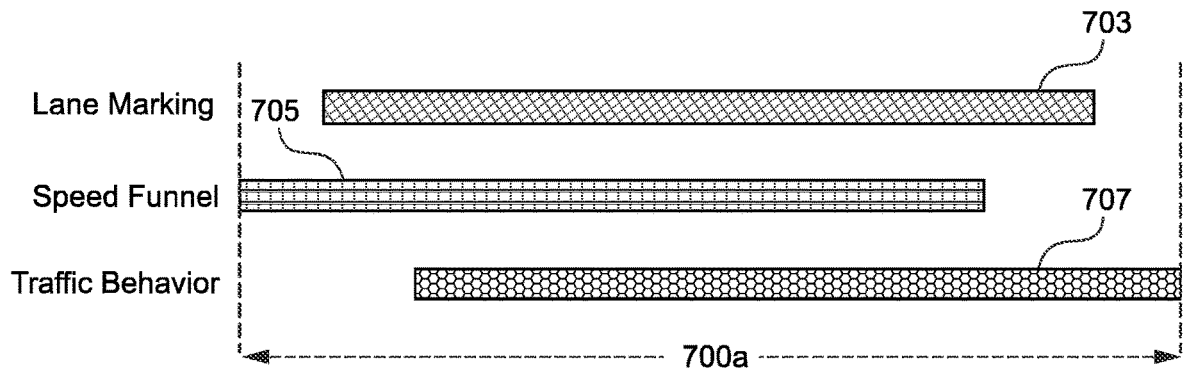
FIGS. 7A-7C are depictions for calculating confidence score for one or more sections of road segment, according to one embodiment.

The method 500 further includes, as illustrated in FIG. 7A, determining a first portion 703 of the at least one segment of the road undergoing roadwork based on the presence of the lane marking thereon; determining a second portion 705 of the at least one segment of the road undergoing roadwork based on the presence of the speed funnel thereon; and determining a third portion 707 of the at least one segment of the road undergoing roadwork based on the determined change in traffic behavior thereon. As may be understood, the first portion 703, the second portion 705 and the third portion 707 may be determined based on the positive indication from the corresponding retrieved lane marking data, speed funnel presence data, and traffic behavior change data.

In step 503, the method 500 includes generating a confidence score based on analysis of the retrieved information about lane marking data, speed funnel presence data, and traffic behavior change data. For this purpose, the method 500 includes assigning weights to each of the first portion, the second portion and the third portion. Herein, the weight assigned to the first portion is 'P1', the weight assigned to the second portion is 'P2' and the weight assigned to the third portion is 'P3'. A sum of the weights of the first portion, the second portion and the third portion is equal to 1.

Figure 7B:
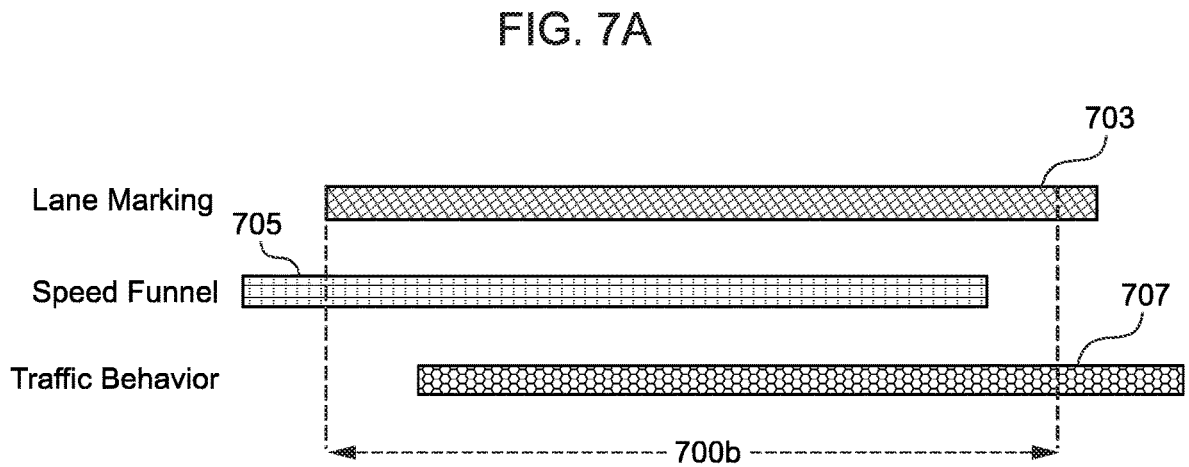
Figure 7C:
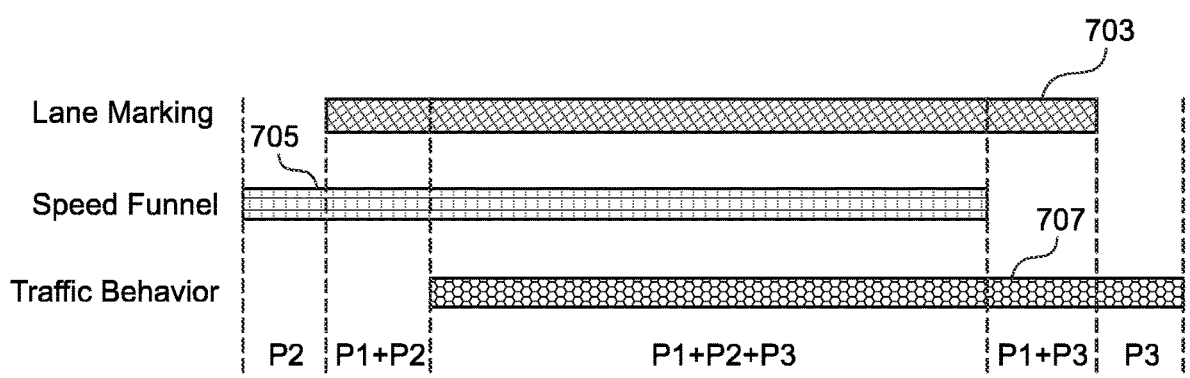

Further, the method 500 includes determining one or more sections of the at least one segment of the road, wherein each of the one or more sections overlaps at least one of the first portion, the second portion and the third portion. The sections may be defined based on the changes in encountering of the first portion, the second portion and the third portion along the at least one segment of the road. Further, the method 500 includes calculating confidence score for each of the one or more sections based on the weights assigned to the corresponding overlapped first portion, the second portion and the third portion. The confidence score of each of the one or more sections is calculated as sum of the weights of the corresponding overlapped first portion, the second portion and the third portion. As illustrated in FIG. 7C, the road segment gets divided into five number of sections, and the calculated confidence for, starting from left, a first section is P2 (as only second portion 705 is overlapping), a second section is P1+P2 (as first portion 703 and second portion 705 are overlapping), a third section is P1+P2+P3 (as all first portion 703, second portion 705 and third section 707 are overlapping), a fourth section is P1+P3 (as first portion 703 and third portion 707 are overlapping), and a fifth section is P3 (as only third portion 707 is overlapping). In the present embodiments, the weights have been calibrated in a manner that the confidence score of each of the one or more sections varies between 0 and 1. In an exemplary configuration, the weight assigned to the first portion is 0.25, the weight assigned to the second portion is 0.50 and the weight assigned to the third portion is 0.25. In such case, the confidence score of the first section is 0.25, the confidence score of the second section is 0.75, the confidence score of the third section is 1, the confidence score of the fourth section is 0.75, and the confidence score of the fifth section is 0.25.

In step 505, the method 500 includes validating the existence of the roadwork on the at least one segment of the road, based on the generated confidence score. In the present embodiments, the roadwork platform 113 may calculate a confidence score of the roadwork 107 on the road segment of interest based on lane marking data, speed funnel presence data, and traffic behavior change data as discussed above. In the present implementations, if the calculated confidence score is above a threshold value, then the roadwork platform 113 can output a validation of the roadwork 107 on the segment. Such threshold value may be arbitrarily defined or may be calculated based on experimental data of past observations.

In an alternate embodiment, as illustrated in FIG. 7A, a combined range of the first portion, the second portion and the third portion is calculated to determine an extensive section (represented by numeral 700A) of the at least one segment of the road undergoing roadwork. It may be contemplated by a person skilled in the art that such extensive section provides maximum safety by selecting and employing largest extension of the road segment which may possibly be undergoing roadwork. In yet another alternate embodiment, as illustrated in FIG. 7B, an average of the first portion, the second portion and the third portion is calculated to determine an average section (represented by numeral 700B) of the at least one segment of the road undergoing roadwork. Such average section provides reasonable safety without unduly affecting movement of the vehicle by selecting and employing average extension of the road segment which may possibly be undergoing roadwork. It shall be appreciated the confidence score given to such extensive section 700A and/or average section 700B is '1'.

In one embodiment, the information about the validation of the existence of roadwork can then be used to determine how to operate an autonomous vehicle. For example, if a roadwork (such as, roadwork 107) is predicted to be present, then a more autonomous operation of the vehicle can be disabled, and the driver is expected to drive in more of a manual mode (e.g., requiring the driver to hold the steering wheel as the vehicle operates otherwise in autonomous mode, or to disable some or all autonomous operations). In one embodiment, other use cases include updating the roadwork overlay 301 and/or geographic database 111 with the newly detected roadworks may also be implemented. It is noted that these use cases are provided by way of illustration and not as limitations.

Figure 8:
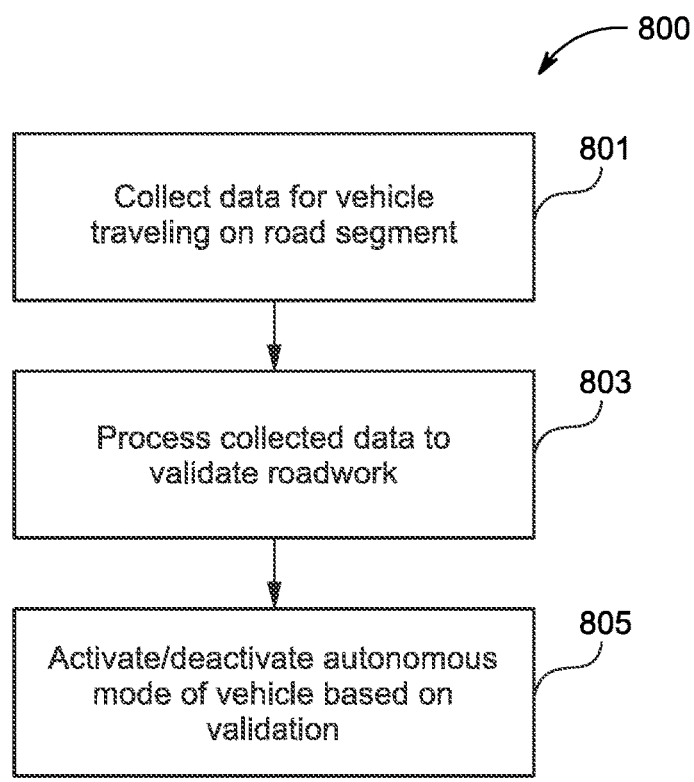
FIG. 8 is a flowchart of a process for controlling an autonomous vehicle using validation of roadwork on the road, according to one embodiment.

FIG. 8 is a flowchart of a process 800 for controlling an autonomous vehicle using validation of presence or absence of roadwork, according to one embodiment. In various embodiments, the roadwork platform 113, roadwork module 119, and/or any of the modules 401-411 may perform one or more portions of the process 800 and may be implemented in, for instance, a chip set including a processor and a memory as shown in FIG. 12. As such, roadwork platform 113, roadwork module 119, and/or any of the modules 401-411 can provide means for accomplishing various parts of the process 800, as well as means for accomplishing embodiments of other processes described herein in conjunction with other components of the system 100. Although the process 800 is illustrated and described as a sequence of steps, it may be contemplated that various embodiments of the process 800 may be performed in any order or a combination and need not include all of the illustrated steps.

In step 801, the sensor data ingestion module 401 and/or the map data module 403 collect lane marking data, speed funnel presence data, and traffic behavior change data from a vehicle traveling on a road segment. This step is equivalent to step 501 of the method 500 described above. However, in this use, the road segment of interest is a road segment for which a prediction of roadwork or other related characteristic is requested.

In step 803, the roadwork platform 113 processes the collected data, to validate the existence of roadwork on the target road segment (as discussed in reference to method 500 of FIG. 5). Additionally, or as a part of the step 803, the roadwork platform 113 may communicate the validation result to the vehicle.

In step 805, the vehicle control module 411 activates or deactivates an autonomous driving mode of the vehicle based on the predicted presence or the predicted absence of the roadwork. In addition, or alternatively, the vehicle control module 411 may present a notification to the driver or occupant of the vehicle prior to activating or deactivating the autonomous mode. For example, the notification can alert the driver that a change in the autonomous mode will occur shortly (e.g., within a specified period of time). In another example, the notification can provide the driver an option to accept or reject the pending change in autonomous driving mode. In one or more embodiments, the autonomous driving mode of the vehicle travelling on one of the one or more sections of the at least one segment of the road is regulated based on the corresponding confidence score for the section. In one instance, the autonomous driving mode of the vehicle is deactivated if the confidence score for the section ahead is between a cut-off threshold and 1. In another instance, a notification is sent to a human operator of the vehicle warning about roadwork if the confidence score for the section ahead is greater than 0 and less than a cut-off threshold. In an exemplary implementation, the cut-off threshold may be 0.50. Further, in some alternate embodiments, the autonomous driving mode of the vehicle is deactivated when travelling on the extensive section 700A (as described in reference to FIG. 7A) and/or average section 700B (as described in reference to FIG. 7B) of the at least one segment of the road.

In one embodiment, the autonomous driving mode is further activated back based on the predicted absence of the roadwork. By way of example, the vehicle can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input but is not expected to be available for control at any time during the trip. This includes both occupied and unoccupied vehicles."

The various embodiments described herein are applicable to vehicles that are classified in any of the levels of automation (levels 0-4) discussed above. For example, in the case of autonomous modes of operation, the vehicle can automatically react to detected roadwork (e.g., by automatically rerouting, slowing down, etc.). Even in the case of completely manual driving (e.g., level 0), the vehicle can present an alert or notification of any validated roadwork to provide greater situational awareness and improve safety for drivers.

In another use case, in addition to or instead of autonomous vehicle control, the data publication module 409 can initiate an update of roadwork overlay of a map database based on the predicted presence or the predicted absence of the roadwork on the road segment. For example, if the segment has been previously unmapped, the predicted roadwork can be transmitted for possible inclusion in roadwork overlay of the geographic database 111. The roadwork platform 113 can use any criteria for determining whether a new roadwork prediction should be incorporated into an existing roadwork overlay. For example, if the report is from a trusted vehicle (e.g., a mapping vehicle operated by a map provider), a single prediction can be used to update the overlay. If the report is from a user vehicle, the roadwork platform 113 may update the overlay only if the report meets predetermined criteria (e.g., confirmed by a predetermined number of other user vehicles, has calculated probability above a threshold value, etc.).

Figure 9:
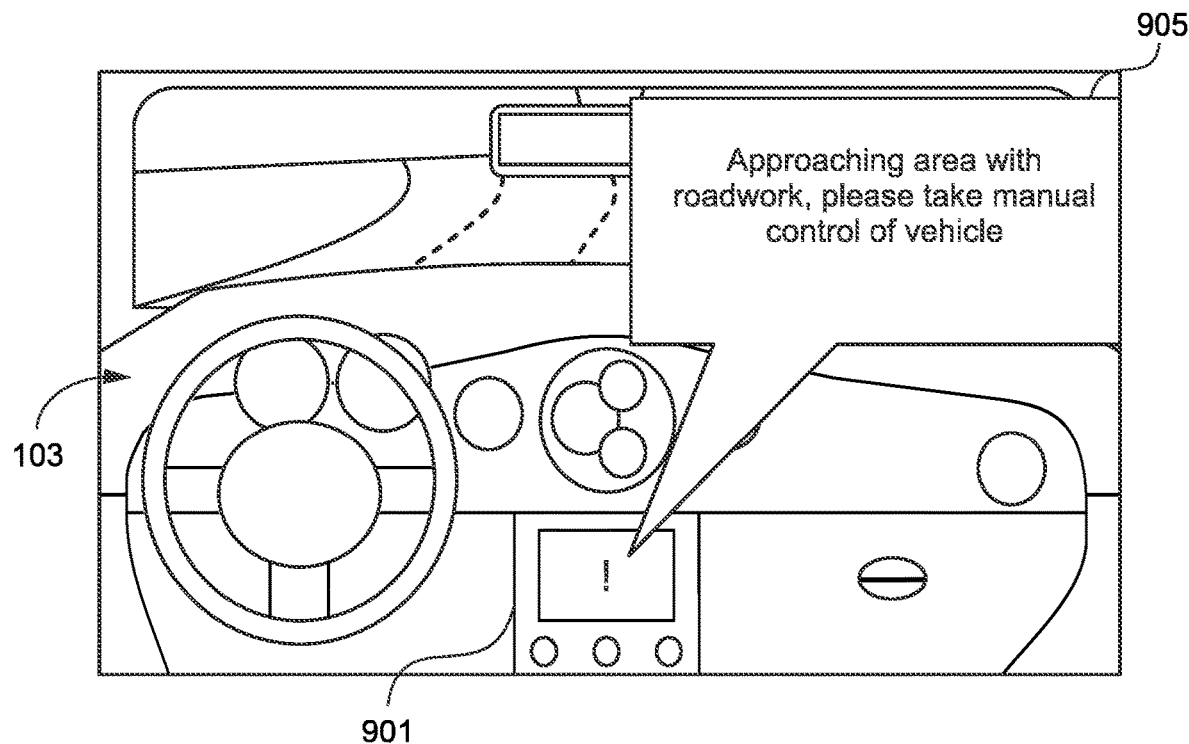
FIG. 9 is a diagram of example user interfaces based on validation of roadwork on the road, according to on embodiment.

FIG. 9 is a diagram of example user interface, according to one embodiment. In the example of FIG. 9, the vehicle 103 is traveling on a road segment that has not been previously mapped for the presence of any roadwork. The vehicle 103 also is currently operating in autonomous driving mode. When the vehicle 103 approaches the segment the present system 100 processes map and sensor data associated with the segment to make a roadwork validation (as discussed). Alternatively, the map and sensor data associated with the segment may already be pre-processed in the system 100. The system 100 then presents the result on a vehicle system 901 of the vehicle 103. This validation then triggers the vehicle system 901 to present a notification or an alert message 905 to indicate that that the vehicle is approaching an area with roadwork and instructs the driver to take manual control for the segment. In addition, the vehicle system 901 can deactivate the autonomous driving mode (e.g., following a period of time after presenting a notification such as the alert message 905).

Referring back to FIG. 1, in one embodiment, the roadwork platform 113 has connectivity over a communication network 125 to the services platform 121 (e.g., an OEM platform) that provides one or more services 123 (e.g., sensor data collection services). By way of example, the services 123 may also be other third-party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 121 uses the output (e.g. roadwork validation) from the roadwork platform 113 to provide services such as navigation, mapping, other location-based services, etc. In one embodiment, the roadwork platform 113 may be a platform with multiple interconnected components. The roadwork platform 113 may include multiple servers, intelligent networking devices, computing devices, components and corresponding software for providing parametric representations of lane lines. In addition, it is noted that the roadwork platform 113 may be a separate entity of the system 100, a part of the one or more services 123, a part of the services platform 121, or included within the vehicle 103 (e.g., a roadwork module 119).

In one embodiment, content providers 127a-127n (collectively referred to as content providers 127) may provide content or data (e.g., including geographic data, parametric representations of mapped features, etc.) to the geographic database 111, the roadwork platform 113, the services platform 121, the services 123, and the vehicle 103. The content provided may be any type of content, such as map content, textual content, audio content, video content, image content, etc. In one embodiment, the content providers 127 may provide content that may aid in the detecting and classifying of roadwork or other related characteristics. In one embodiment, the content providers 127 may also store content associated with the geographic database 111, roadwork platform 113, services platform 121, services 123, and/or vehicle 103. In another embodiment, the content providers 127 may manage access to a central repository of data, and offer a consistent, standard interface to data, such as a repository of the geographic database 111.

By way of example, the roadwork module 119 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the roadwork module 119 can support any type of interface to the user (such as "wearable" circuitry, etc.). In one embodiment, the roadwork module 119 may be associated with the vehicle 103 or be a component part of the vehicle 103.

In one embodiment, the vehicle 103 is configured with various sensors for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC), etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In one scenario, the sensors may detect weather data, traffic information, or a combination thereof. In one embodiment, the vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 125 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the roadwork platform 113, services platform 121, services 123, vehicle 103, and/or content providers 127 communicate with each other and other components of the system 100 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
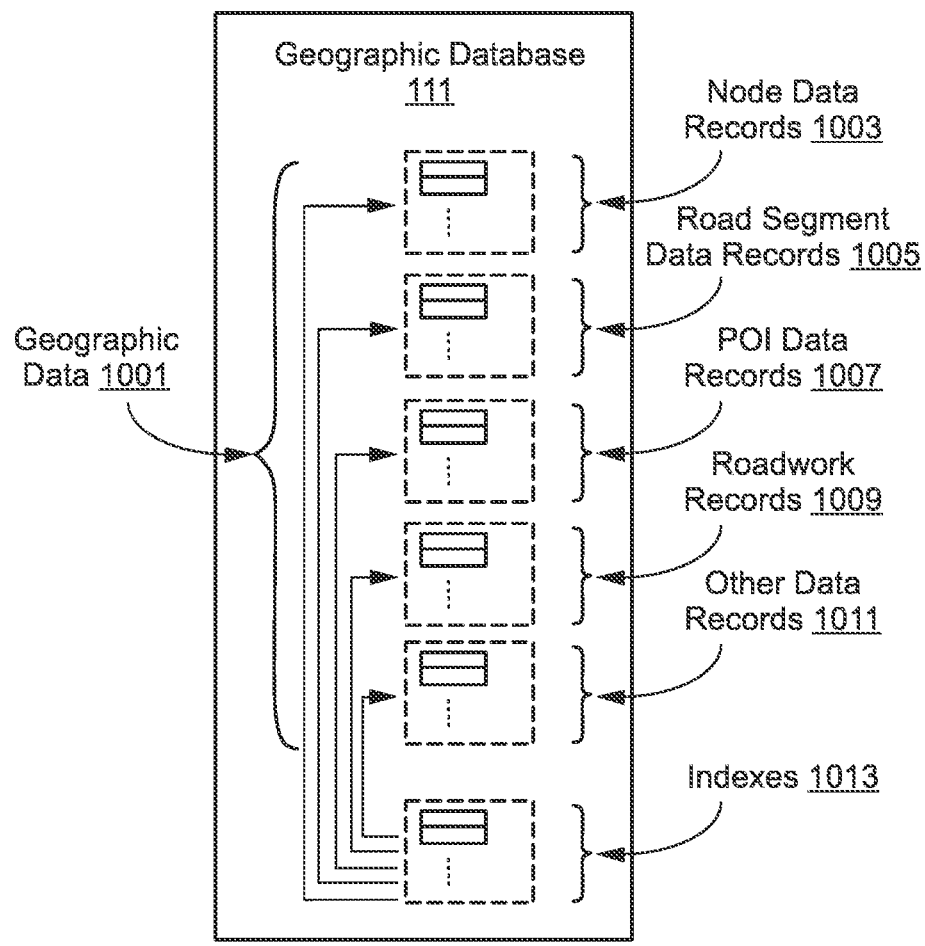
FIG. 10 is a diagram of a geographic database, according to one embodiment.

FIG. 10 is a diagram of a geographic database, according to one embodiment. In one embodiment, the geographic database 111 includes geographic data 1001 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 1003, road segment or link data records 1005, POI data records 1007, roadwork records 1009, other records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 111. In one embodiment, the indexes 1013 may be used to quickly locate data without having to search every row in the geographic database 111 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 1007. The geographic database 111 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 111 can also include roadwork records 1009 for storing predicted/validated roadworks and other related road characteristics. The predicted data, for instance, can be stored as attributes or data records of a roadwork overlay, which fuses with the predicted attributes with map attributes or features. In one embodiment, the roadwork records 1009 can be associated with segments of a road link (as opposed to an entire link). It is noted that the segmentation of the road for the purposes of roadwork prediction can be different than the road link structure of the geographic database 111. In other words, the segments can further subdivide the links of the geographic database 111 into smaller segments (e.g., of uniform lengths such as 5-meters). In this way, roadwork can be predicted and represented at a level of granularity that is independent of the granularity or at which the actual road or road network is represented in the geographic database 111. In one embodiment, the roadwork records 1009 can be associated with one or more of the node records 1003, road segment records 1005, and/or POI data records 1007; or portions thereof (e.g., smaller or different segments than indicated in the road segment records 1005) to provide situational awareness to drivers and provide for safer autonomous operation of vehicles. In this way, the predicted roadwork stored in the roadwork records 1009 can also be associated with the characteristics or metadata of the corresponding record 1003, 1005, and/or 1007.

In one embodiment, the geographic database 111 can be maintained by the content provider 127 in association with the services platform 121 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., roadwork) and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing validation of roadwork may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
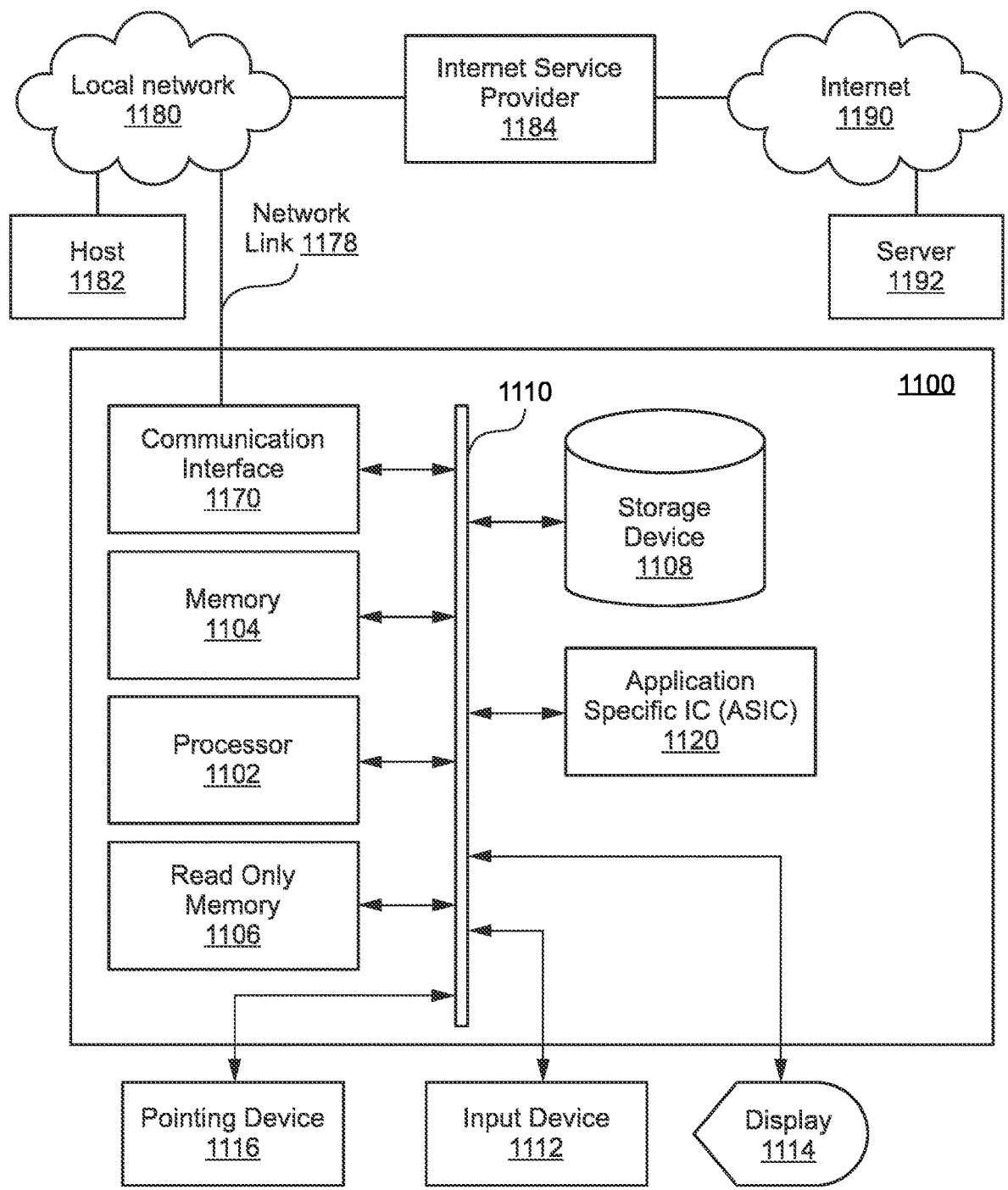
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide validation of roadwork as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing validation of roadwork. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for validation of roadwork. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing validation of roadwork, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected, e.g., a host computer 1182, Internet Service Provider (ISP) 1184. ISP 1184 in turn provides data communication services through Internet 1190. A server host 1192 connected to the Internet 1190 hosts a process that provides a service in response to information received over the Internet. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 125 for providing validation of roadwork.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to provide validation of roadwork as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide validation of roadwork. The memory 1205 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for validating an existence of a roadwork, the method comprising:
    retrieving information for one or more segments of a road captured by a plurality of vehicles, wherein the information comprises lane marking data, speed funnel presence data, and traffic behavior change data;
    calculating, via one or more processors, a confidence score by assigning weight to portions of the one or more segments of the road, the portions comprising a first portion based on the lane marking data, a second portion based on the speed funnel presence data, and a third portion based on the traffic behavior change data;
    validating the existence of the roadwork on at least one of the one or more segments of the road based on the confidence score; and
    deactivating an autonomous driving mode of a vehicle travelling on the at least one of the one or more segments of the road upon the validation of the existence of the roadwork.

2. The computer-implemented method of claim 1 further comprising:
    assigning the weight to each of the first portion, the second portion, and the third portion, wherein a sum of the weights of the first portion, the second portion, and the third portion is equal to 1.

3. The computer-implemented method of claim 2, further comprising:
    determining one or more sections of the one or more segments of the road, wherein each of the one or more sections overlaps at least one of the first portion, the second portion, and the third portion; and
    calculating the confidence score for each of the one or more sections based on the weight assigned to the corresponding overlapped at least one of the first portion, the second portion, and the third portion.

4. The computer-implemented method of claim 3, wherein the confidence score of each of the one or more sections is a sum of the weights of the corresponding overlapped at least one of the first portion, the second portion, and the third portion.

5. The computer-implemented method of claim 4, wherein the confidence score of each of the one or more sections is between 0 and 1.

6. The computer-implemented method of claim 5, further comprising:
    deactivating the autonomous driving mode of the vehicle based on the confidence score of one of the one or more sections being between a cut-off threshold and 1.

7. The computer-implemented method of claim 5, further comprising:
controlling the autonomous driving mode of the vehicle travelling on one of the one or more sections of the one or more segments of the road based on the corresponding confidence score of the one of the one or more sections.

8. The computer-implemented method of claim 7, further comprising:
transmitting a notification to the vehicle indicating the roadwork based on the confidence score of the one of the one or more sections being greater than 0 and less than a cut-off threshold.

9. The computer-implemented method of claim 1, further comprising:
calculating a combined range of the first portion, the second portion, and the third portion to determine an extensive section of the one or more segments of the road, wherein the extensive section corresponds to a largest extension of the road segment undergoing roadwork.

10. The computer-implemented method of claim 9, further comprising:
deactivating the autonomous driving mode of the vehicle travelling on the extensive section of the one or more segments of the road.

11. A system for validating an existence of a roadwork, comprising:
at least one memory configured to store computer program code instructions; and
at least one processor configured to execute the computer program code instructions to:
retrieve information for one or more segments of a road captured by a plurality of vehicles, wherein the information comprises lane marking data, speed funnel presence data, and traffic behavior change data;
calculate, via the at least one processor, a confidence score by assigning weight to portions of the one or more segments of the road, the portions comprising a first portion based on the lane marking data, a second portion based on the speed funnel presence data, and a third portion based on the traffic behavior change data;
validate the existence of the roadwork on at least one of the one or more segments of the road based on the confidence score; and
deactivate an autonomous driving mode of a vehicle travelling on the at least one of the one or more segments of the road upon the validation of the existence of the roadwork.

12. The system of claim 11, wherein the at least one processor is further configured to:
assign the weight to each of the first portion, the second portion and the third portion, wherein a sum of the weights of the first portion, the second portion and the third portion is equal to 1.

13. The system of claim 12, wherein the at least one processor is further configured to:
determine one or more sections of the one or more segments of the road, wherein each of the one or more sections overlaps at least one of the first portion, the second portion and the third portion; and
calculate the confidence score for each of the one or more sections based on the weight assigned to the corresponding overlapped at least one of the first portion, the second portion, and the third portion.

14. The system of claim 13, wherein the confidence score of each of the one or more sections is a sum of the weights of the corresponding overlapped at least one of the first portion, the second portion and the third portion.

15. The system of claim 14, wherein the confidence score of each of the one or more sections is between 0 and 1.

16. The system of claim 15, wherein the at least one processor is further configured to:
deactivate the autonomous driving mode of the vehicle based on the confidence score of one of the one or more sections being between a cut-off threshold and 1.

17. The system of claim 15, wherein the at least one processor is further configured to:
transmit a notification to the vehicle indicating the roadwork based on the confidence score of one of the one or more sections being greater than 0 and less than a cut-off threshold.

18. A computer program product comprising a non-transitory computer readable medium having stored thereon computer executable instructions, which when executed by one or more processors, cause the one or more processors to carry out operations for validating an existence of a roadwork, the operations comprising:
retrieving information for one or more segments of a road captured by a plurality of vehicles, wherein the information comprises lane marking data, speed funnel presence data, and traffic behavior change data;
calculating, via the one or more processors, a confidence score by assigning weight to portions of the one or more segments of the road, the portions comprising a first portion based on the lane marking data, a second portion based on the speed funnel presence data, and a third portion based on the traffic behavior change data;
validating the existence of the roadwork on at least one of the one or more segments of the road based on the confidence score; and
enabling deactivation an autonomous driving mode of a vehicle travelling on the at least one of the one or more segments of the road upon the validation of the existence of the roadwork.

* * * * *